US009170175B2

(12) United States Patent
Chatenet et al.

(10) Patent No.: US 9,170,175 B2
(45) Date of Patent: Oct. 27, 2015

(54) METHOD FOR DETERMINING A ZONE WHERE A COMBUSTION CHAMBER IGNITION PLUG IS TO BE POSITIONED, AND ASSOCIATED COMBUSTION CHAMBER

(75) Inventors: Luc Henri Chatenet, Seine Port (FR); David Gino Stifanic, La Rochette (FR)

(73) Assignee: SNECMA, Paris (FR)

( * ) Notice: Subject to any disclaimer, the term of this patent is extended or adjusted under 35 U.S.C. 154(b) by 503 days.

(21) Appl. No.: 13/617,624

(22) Filed: Sep. 14, 2012

(65) Prior Publication Data

US 2013/0078585 A1 Mar. 28, 2013

(30) Foreign Application Priority Data

Sep. 26, 2011 (FR) ...................................... 11 58557

(51) Int. Cl.
*G01M 15/04* (2006.01)
*F02F 1/24* (2006.01)
*H01T 13/58* (2011.01)

(52) U.S. Cl.
CPC ............... *G01M 15/04* (2013.01); *F02F 1/242* (2013.01); *H01T 13/58* (2013.01)

(58) Field of Classification Search
CPC ................................ F02F 1/242; G01M 15/04
USPC ................ 73/114.42, 114.48, 114.62, 114.77
See application file for complete search history.

(56) References Cited

U.S. PATENT DOCUMENTS

| 2011/0045731 A1* | 2/2011 | Musasa et al. ..................... 445/7 |
| 2011/0279008 A1* | 11/2011 | Korenev ........................ 313/141 |
| 2013/0196563 A1* | 8/2013 | Lynch et al. ...................... 445/7 |
| 2014/0011417 A1* | 1/2014 | Ichihara ........................... 445/4 |

FOREIGN PATENT DOCUMENTS

| DE | 42 38 179 A1 | 5/1994 |
| DE | 196 45 201 A1 | 6/1997 |
| DE | 100 07 659 A1 | 9/2001 |
| EP | 1 936 145 A2 | 6/2008 |
| EP | 1 936 145 A3 | 6/2008 |
| JP | 6-26340 A | 2/1994 |

OTHER PUBLICATIONS

Y Yan, et al., "Investigation of spray characteristics in a spray-guided DISI engine using PLIF and LDV", Third International Conference on Optical and Laser Diagnostics, Journal of Physics: Conference Series 85, XP002675802, 2007, pp. 1-13.

* cited by examiner

*Primary Examiner* — Eric S McCall
(74) *Attorney, Agent, or Firm* — Oblon, McClelland, Maier & Neustadt, L.L.P.

(57) ABSTRACT

A method for determining an optimum positioning zone of an ignition plug fitted with a semiconductor element in a combustion chamber is provided. The method includes: determining, using a test ignition plug, of an optimum fuel flow rate value intended to ensure optimum long-term operation of the ignition plug; successively measuring quantities of fuel collected at the surface of one end of a test tool positioned in the combustion chamber in successive test ignition tests; determining the fuel flow rate values corresponding to the measured quantities of fuel; comparing the fuel flow rate values and of the optimum fuel flow rate value, and determining the optimum positioning zone following the comparing.

9 Claims, 3 Drawing Sheets

METHOD FOR DETERMINING A ZONE WHERE A COMBUSTION CHAMBER IGNITION PLUG IS TO BE POSITIONED, AND ASSOCIATED COMBUSTION CHAMBER

TECHNICAL FIELD AND PRIOR ART

The invention concerns a method for determining a zone where a combustion chamber ignition plug is to be positioned, together with a method for positioning an ignition plug in a combustion chamber which implements the method of determining the optimum positioning zone of the invention.

The invention also concerns a test tool for implementing the method to determine the optimum positioning zone of the invention, and a combustion chamber fitted with at least one ignition plug disposed, in the combustion chamber, in an optimum positioning zone resulting from the implementation of the method of the invention.

The ignition of certain engines is currently accomplished using ignition plugs fitted with semiconductor elements.

FIG. 1 represents, as an example, a lengthways section view of an ignition plug fitted with a semiconductor element, and FIG. 2 represents an enlarged lengthways section view of one end of the ignition plug represented in FIG. 1.

Ignition plug 1 includes a first peripheral electrode 2 having the shape of a rotationally symmetrical cylinder and a cylindrical central electrode 3 positioned inside peripheral electrode 2. Electrically insulating elements 4a, 4b separate central electrode 3 from peripheral electrode 2 in the area of the plug body, and a semiconductor element 5 separates central electrode 3 from peripheral electrode 2 in the area of the end of the plug which emerges in the combustion chamber when the plug is installed in the device. Semiconductor element 5 has a flat face S which, when the ignition plug is installed in the combustion chamber, is brought into contact with the fuel at ignition. Flat face S is positioned at a distance h from the ends of electrodes 2 and 3, which emerge in the combustion chamber (cf. FIG. 2).

To generate sparks a voltage is applied between the electrodes of the ignition plug. One advantage of the plugs fitted with semiconductor elements is the possibility of generating sparks from low power voltages compared to the voltages required to be applied to plugs without such elements. Lighter and more reliable ignition units (electronic units providing the plug with electrical energy) and connecting wires can then be produced.

However, a major problem experienced with ignition plugs fitted with semiconductor elements is the speed with which the semiconductor elements become worn, where the said wear leads to malfunctions.

At the current time the skilled man in the art is aware that the wear rate of the semiconductors depends on certain parameters, namely the ignition energy, the pressure present in the combustion chamber and the temperature to which the semiconductor is subjected. Knowledge of these parameters thus leads the skilled man in the art to choose from among semiconductor materials those most able to tolerate the ignition energy, pressure and temperature values to which these materials must be subjected.

Despite this, however, major reliability problems persist. Indeed, certain plugs can have a lifetime of less than one hundred hours, whereas others can remain effective for much longer periods, such as 500 hours, or more.

It follows that ignition reliability remains low.

In the case of civil engines, the presence of two plugs enables emergency interventions to be limited. Even if the requirement is infrequent, the reliability of in-flight re-ignition in this case remains the main problem.

In the case of military engines it is not always the case that there are two plugs. Where takeoff from aircraft carriers is concerned, for example, the reliability of afterburning ignition is essential. Combustion must occur very rapidly, and any doubt during maintenance operations must lead the plug to be changed. The cost of these maintenance operations is then very high. This is a real disadvantage.

The present invention enables this disadvantage to be remedied.

ACCOUNT OF THE INVENTION

Indeed, the invention concerns a method for determining an optimum positioning zone of an ignition plug in a combustion chamber, where the ignition plug is fitted with a semiconductor element which has a flat face, on which fuel is deposited in an ignition operation, where the method includes:

a step of determination, using a test ignition plug located outside the combustion chamber, where the test ignition plug is identical to the ignition plug, of an optimum fuel flow rate value intended to guarantee optimum long-term operation of the ignition plug, a succession of measurements of quantities of fuel collected at the surface of one end of a test tool, of identical encumbrance to an ignition plug, in successive test ignition tests, where the test tool is positioned, for each measurement of quantity of fuel, in a different location of the combustion chamber, and where the said different location is a different position in the chain of dimensions of the ignition plug, a step of determining the fuel flow rate values corresponding to the measured quantities of fuel, a step of comparison of the fuel flow rate values corresponding to the measured quantities of fuel and of the optimum fuel flow rate value, and a step of determination of the optimum positioning zone following the comparison.

The invention also concerns a method of positioning of an ignition plug in a combustion chamber, where the ignition plug is fitted with a semiconductor element which has a surface on which fuel is deposited during an ignition, characterised in that the method includes:

a step of determination of an optimum positioning zone of an ignition plug in the combustion chamber according to the invention, and a positioning of the plug in the optimum positioning zone.

The invention also concerns a test tool for implementing a method of determination of an optimum positioning zone of an ignition plug in a combustion chamber according to the invention, where the test tool includes an end-piece which contains an element made of a material able to absorb the fuel which is collected at the surface of the end of the test tool in a test ignition test.

The invention also concerns a combustion chamber fitted with at least one ignition plug which is disposed, in the combustion chamber, in an optimum positioning zone resulting from implementing the method of determination of an optimum positioning zone of the ignition plug of the invention.

The step of determining an optimum fuel flow rate value able to ensure optimum long-term operation of the ignition plug is undertaken by means of drip tests on the test ignition plug. The optimum fuel flow rate value is then equal to the maximum fuel flow rate guaranteeing that, during a period equal to the period separating two successive sparks of an ignition cycle, the face of the semiconductor element is not entirely covered with fuel.

Indeed, during preliminary tests, the Applicant determined that the wear of the semiconductor is greatly accelerated when the fuel wets completely the surface of the semiconductor for the period separating two successive sparks, and that it is this covering of the entire surface of the semiconductor by the fuel which is the cause of the substantial dispersions mentioned above.

In a particularly advantageous manner, the Applicant proposes to limit the wear of the plug by means of a positioning of the plug which prevents it from being covered between two successive sparks.

According to an improvement of the invention, the step of measurement of the quantities of fuel with the test tool is accomplished with multiple identical combustion chambers, such that an optimum positioning zone is determined for each combustion chamber of the multiple identical combustion chambers. The optimum positioning zone of the plug is then a positioning zone deduced from all the optimum positioning zones.

BRIEF DESCRIPTION OF THE FIGURES

Other characteristics and advantages of the invention will appear on reading a preferential embodiment made in reference to the attached figures, among which.

In all the figures the same references designate the same elements.

DETAILED ACCOUNT OF A PREFERENTIAL EMBODIMENT OF THE INVENTION

Figure 3:
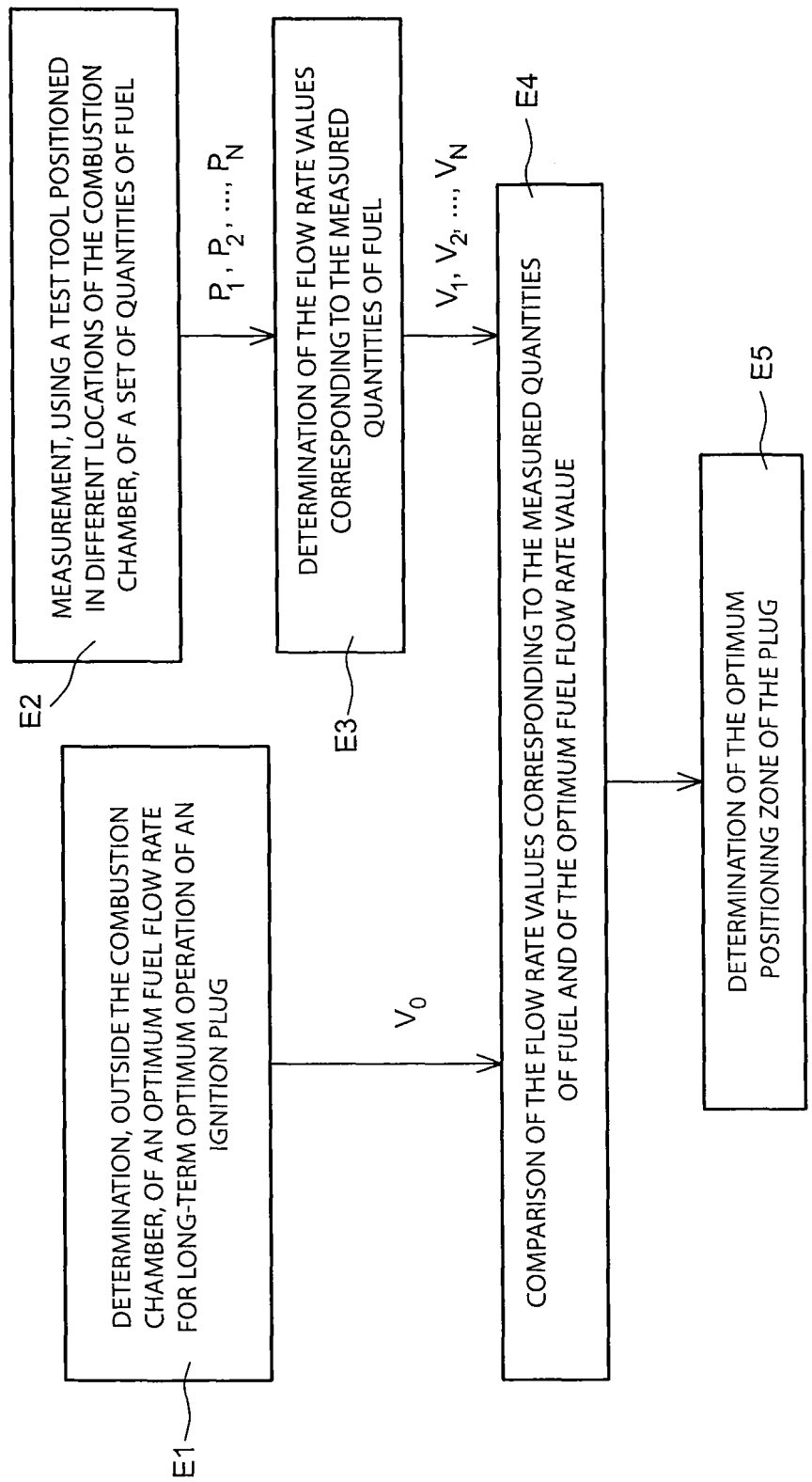
FIG. 3 represents a flow chart of the method of the invention.

FIG. 3 represents a flow chart of the method of determining the optimum positioning zone of the ignition plug of the invention.

The method includes:
 a step E1 of determining an optimum fuel flow rate value able to ensure optimum long-term operation of the ignition plug, using a test ignition plug identical to the ignition plug located outside the combustion chamber;
 a step E2 of measurement, using a test tool positioned in different locations of the combustion chamber, of a set of quantities of fuel collected at the surface of one end of the test tool, during successive test ignition tests;
 a step E3 of determining the fuel flow rate values corresponding to the measured quantities of fuel,
 a step E4 of comparison of the fuel flow rate values corresponding to the measured quantities of fuel with the optimum fuel flow rate value determined in step E1, and
 a step E5 of definition of the optimum positioning zone of the plug from the results of the comparison.

Step E1 is preferentially accomplished by means of drip tests on a test ignition plug over periods matching the real periods of use, for example 900 hours. The drip tests are undertaken outside the combustion chamber.

Figure 1:
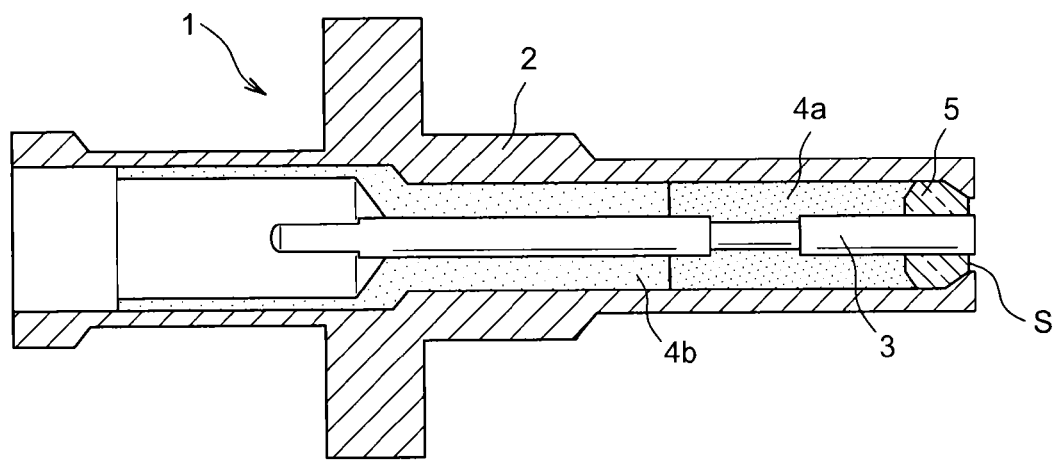
FIG. 1—previously described—represents a lengthways section view of an example of an ignition plug concerned by the method of the invention.
Figure 2:
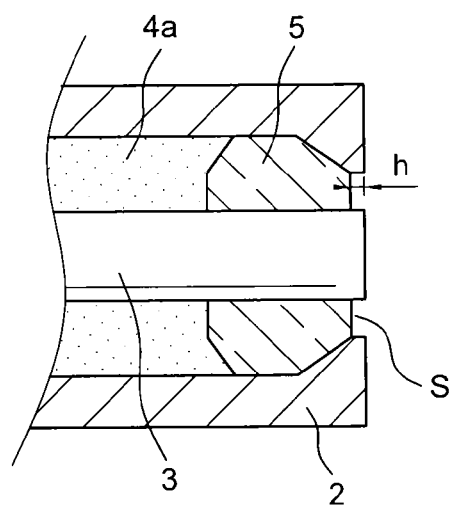
FIG. 2—previously described—represents an enlarged lengthways section view of one end of the ignition plug represented in FIG. 1.

The test ignition plug is identical to the ignition plug intended to be installed in the device, such that the semiconductor element which it contains also has a flat face S located at a distance h from the ends of electrodes 2 and 3 (cf. FIG. 2). The fuel is deposited drop-by-drop on flat face S. The optimum fuel flow rate value $V_0$ able to result in optimum long-term operation of the ignition plug is equal to the maximum fuel flow rate guaranteeing that, during a period equal to the period separating two successive sparks of an ignition cycle in normal operation, face S of the semiconductor element is not entirely covered with fuel.

Step E2 consists of a succession of measurements of the quantity of fuel during successive test ignition tests made with no ignition plug, where a test tool replaces the ignition plug. The conditions of a test ignition test are preferentially identical to those of a conventional ignition (same frequency, same duration).

Figure 4:
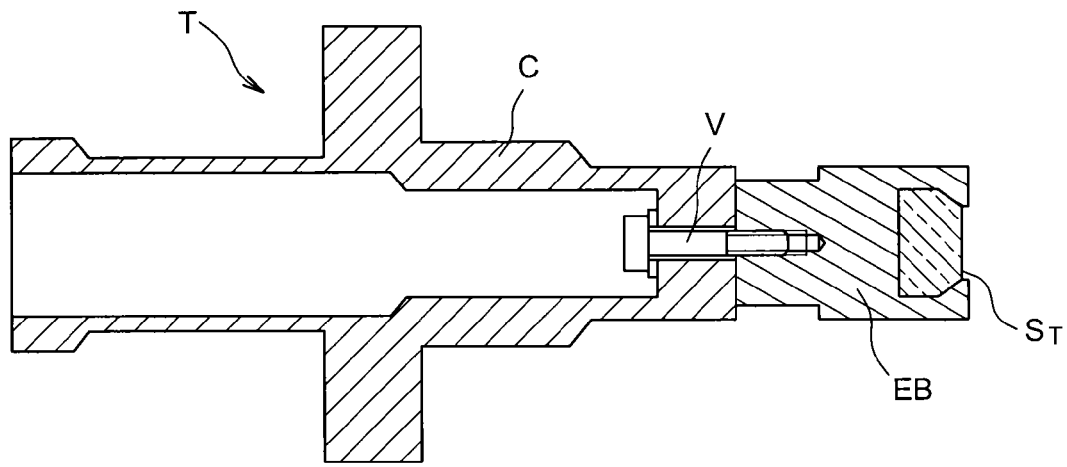
FIG. 4 represents a lengthways section view of a control tool able to implement the method of the invention.
Figure 5:
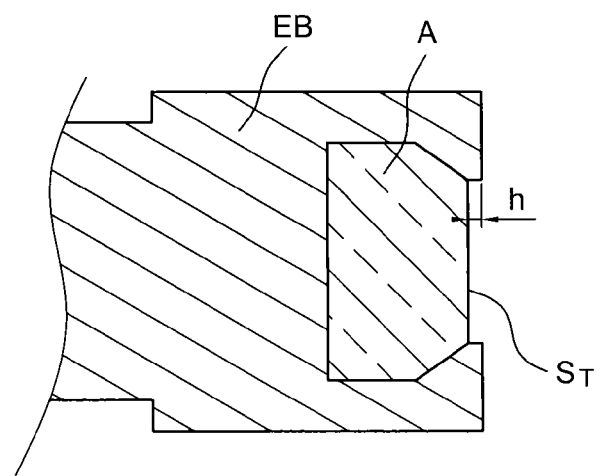
FIG. 5 represents an enlarged lengthways section view of the end of the control tool represented in FIG. 4.

As a non-restrictive example, a test tool T is represented in FIGS. 4 and 5. Test tool T has an encumbrance equal to that of an ignition plug, in order that it may be installed in the combustion chamber in the place of an ignition plug. It includes a body C and an end-piece EB.

End-piece EB is attached to body C, for example by a screw V. End-piece EB contains an element A made of a material able to absorb the fuel. The encumbrance of the end of end-piece EB is identical to that of an ignition plug. A flat face $S_T$ of element A is thus located at a distance h from the end of the tool which emerges in the combustion chamber.

The test tool is installed in the combustion chamber in the space intended to receive the ignition plug. The test tool is preferentially positioned so as to be in conformity with the chain of dimensions which defines the positioning of an ignition plug. The end of the test tool is thus positioned at one of the locations where the end of the ignition plug may be positioned when it is installed in the combustion chamber. In order to explore all the locations where the end of the ignition plug may be positioned, end-pieces EB of different lengths are used in succession, and the test tool includes means able to allow these end-pieces to be moved off-centre.

In each test ignition test undertaken during step E2, the fuel which reaches face $S_T$ of element A is absorbed by element A. At the end of each test ignition test the test tool is removed and the weight of the quantity of fuel which has been absorbed is calculated as the difference between the weight of the tool after the test and the weight of the tool before the test. For N test ignition tests, N values of weights $P_1, P_2, \ldots, P_N$ are determined in this manner.

A step E3 of determining fuel flow rate values $V_1, V_2, \ldots, V_N$ corresponding to the measured fuel weights $P_1, P_2, \ldots, P_N$ follows step E2. From the information concerning the weight of the collected fuel and knowledge of the specific gravity of the fuel, it is indeed possible to deduce the volume of fuel which has been collected by the test tool and, from knowledge of the volume of fuel collected by the test tool and of the duration of the test session, it is then possible to deduce the flow rate of fuel associated with the test.

Several tests are preferentially undertaken for a given position of the test tool, and the flow rate which is taken into account for a given position of the test tool is then the average flow rate value which results from all the calculated flow rate values. An average fuel flow rate value is then calculated for each position of the chain of dimensions of the ignition plug.

Step E3 is then followed by step E4 of comparison of the fuel flow rate values calculated in step E3 with the optimum fuel flow rate value determined in step E1, followed by step E5 of definition of the optimum positioning zone of the plug from the results of the comparison.

The optimum positioning zone of the plug is then equal to a set of positions of the plug for which the fuel flow rate values calculated in step E4 remain below the optimum fuel flow rate value measured in step E1. According to an example embodiment, removal of 0.8 grams of fuel during a 10-second ignition cycle was established as the maximum admissible value for the plug to operate. This maximum value essentially depends on the area of the plug, the duration of the ignition cycle and the frequency of the sparks.

According to an improvement of the invention, steps E2 and E3 are accomplished with several engines, to increase the possible dispersions, thus allowing an optimum zone common to a set of engines of identical definition to be determined. Because this optimum common zone can be obtained, it is then no longer necessary for the combustion chamber in which the plug is installed to be the one which enabled the measurements of quantities of fuel to be made (step E2).

Generally, the optimum positioning zone of the plug obtained by the method of the invention is to be found in the ignition plug's chain of dimensions. However, during testing, it may come to light that this zone must be located, wholly or in part, outside the chain of dimensions. The method of the invention then provides for the implementation of structural modifications of the combustion chamber(s) and/or of the ignition plug(s) so as to define an optimum positioning zone compatible with the chain of dimensions.

The method of the invention then advantageously enables plug positions capable of giving the device great reliability to be defined.

The invention claimed is:

1. A method for determining an optimum positioning zone of an ignition plug in a combustion chamber, where the ignition plug is fitted with a semiconductor element which has a flat face on which fuel is deposited in an ignition operation, wherein the method comprises the steps of:
   determining an optimum fuel flow rate value using a test ignition plug located outside the combustion chamber, the test ignition plug being identical to the ignition plug, wherein the optimum fuel flow rate value is a fuel flow rate value which guarantees that no fuel completely covers the face of the semiconductor element of the test ignition plug during a period,
   wherein the period is equal to a duration which separates two successive sparks of an ignition cycle in normal operation;
   successively measuring successive test ignition test, where for each measurement, a test tool having a same size as the ignition plug is positioned in a different location of the combustion chamber, and for each measurement and each position, a quantity of fuel collected at a surface of one end of the test tool is measured;
   determining the fuel flow rate values corresponding to the measured quantities of fuel;
   comparing the fuel flow rate values corresponding to the measured quantities of fuel and of the optimum fuel flow rate value; and
   determining the optimum positioning zone following the comparison.

2. The method according to claim 1, further comprising making a series of successive measurements of quantity of fuel for a given position of a test tool, such that the measured quantity of fuel which corresponds to a given position of the test tool is the average value of the successive measurements.

3. The method according to claim 1, further comprising making measurements of quantity of fuel with different identical combustion chambers, such that an average optimum zone of positioning of an ignition plug is determined from the different optimum positioning zones determined with each combustion chamber.

4. The method according to claim 1, wherein a measurement of quantity of fuel collected at the surface of an end of a test tool is a step of measurement of weight of the absorbed fuel, in a test ignition test, by an absorbent element positioned at the end of the test tool.

5. The method of positioning of an ignition plug in a combustion chamber, where the ignition plug is fitted with a semiconductor element which has a surface on which fuel is deposited during an ignition, wherein the method further comprises:
   determining an optimum positioning zone of an ignition plug in the combustion chamber according to the method of claim 1, and
   positioning the plug in the optimum positioning zone.

6. A combustion chamber fitted with at least one ignition plug, wherein the ignition plug is disposed, in the combustion chamber, in a positioning zone which results from the implementation of a method according to claim 1.

7. The method according to claim 1, wherein if the optimum positioning zone appears to be located, wholly or in part, outside a chain of dimensions defining a positioning of the ignition plug, structural modifications of at least one of the combustion chamber or the test tool are made until an optimum positioning zone is located within the chain of dimensions.

8. A test tool for implementing a method for determining an optimum positioning zone of an ignition plug in a combustion chamber according to claim 7, wherein the test tool includes an end-piece containing an element made of a material able to absorb the fuel collected on the surface of the end of the test tool in the test ignition test.

9. The test tool according to claim 8, wherein the end-piece can be removed, and comprising means for moving the end-piece off-center.

* * * * *